US010211762B2

(12) United States Patent
Li et al.

(10) Patent No.: US 10,211,762 B2
(45) Date of Patent: Feb. 19, 2019

(54) DRIVE CIRCUIT FOR A PERMANENT MAGNET MOTOR

(71) Applicant: Johnson Electric S.A., Murten (CH)

(72) Inventors: Yue Li, Hong Kong (CN); Chi Ping Sun, Hong Kong (CN); Bao Ting Liu, Shenzhen (CN); En Hui Wang, Shenzhen (CN); Fei Xin, Shenzhen (CN); Shing Hin Yeung, Hong Kong (CN); Xiu Wen Yang, Shenzhen (CN); Yan Yun Cui, Shenzhen (CN); Shu Juan Huang, Shenzhen (CN)

(73) Assignee: JOHNSON ELECTRIC INTERNATIONAL AG, Murten (CH)

( * ) Notice: Subject to any disclaimer, the term of this patent is extended or adjusted under 35 U.S.C. 154(b) by 0 days.

(21) Appl. No.: 14/822,292

(22) Filed: Aug. 10, 2015

(65) Prior Publication Data

US 2016/0043666 A1  Feb. 11, 2016

(30) Foreign Application Priority Data

Aug. 8, 2014  (CN) .......................... 2014 1 0390592
Aug. 15, 2014  (CN) .......................... 2014 1 0404755

(51) Int. Cl.
H02K 29/03 (2006.01)
H02P 1/46 (2006.01)
(Continued)

(52) U.S. Cl.
CPC ............... *H02P 1/465* (2013.01); *H02P 6/22* (2013.01); *H02P 7/066* (2013.01); *H02P 7/295* (2013.01); *H02P 2207/05* (2013.01)

(58) Field of Classification Search
CPC ............ H02P 1/465; H02P 1/22; H02K 29/03
(Continued)

(56) References Cited

U.S. PATENT DOCUMENTS 5,675,226 A * 10/1997 Riola' ..................... H02K 29/03
                                                    318/400.26
6,114,827 A *  9/2000 Alvaro ................... H02K 29/10
                                                    318/265
(Continued)

FOREIGN PATENT DOCUMENTS

CN       201409107      *  2/2010

Primary Examiner — Jorge L Carrasquillo
Assistant Examiner — Cortez Cook
(74) Attorney, Agent, or Firm — Muncy, Geissler, Olds & Lowe, P.C.

(57) ABSTRACT

A drive circuit for an electric motor having a wound stator and a permanent magnet rotor, includes a controllable bidirectional AC switch connected in series with a stator winding between two terminals for connecting to an AC power supply. First and second position sensors detect the position of magnetic poles of the rotor. A voltage regulating circuit is connected between the two terminals and the controllable bidirectional AC switch and configured to supply power to the first sensor during the positive cycle and to the second position sensor during the negative cycle of the AC power supply such that the controllable bidirectional AC switch is switched between a conductive state and a non-conductive state in a preset manner, thus enabling the stator to rotate the rotor in only one predetermined direction during start-up.

14 Claims, 5 Drawing Sheets

(51) Int. Cl.
*H02P 1/22* (2006.01)
*H02P 7/06* (2006.01)
*H02P 7/295* (2016.01)
*H02P 6/22* (2006.01)

(58) Field of Classification Search
USPC .......................................................... 318/275
See application file for complete search history.

(56) References Cited

U.S. PATENT DOCUMENTS

| | | | | |
|---|---|---|---|---|
| 6,177,777 B1* | 1/2001 | Piazzalunga | ............ | H02P 1/465 318/476 |
| 2007/0271915 A1* | 11/2007 | Safran | ........................ | F03G 7/06 60/531 |
| 2010/0164428 A1* | 7/2010 | Xu | ........................... | F01D 15/10 318/767 |
| 2010/0207557 A1* | 8/2010 | Wilkinson | ................ | H02P 1/22 318/400.15 |

* cited by examiner

DRIVE CIRCUIT FOR A PERMANENT MAGNET MOTOR

CROSS REFERENCE TO RELATED APPLICATIONS

This non-provisional patent application claims priority under 35 U. S. C. § 119(a) from Patent Application No. 201410390592.2 filed in The People's Republic of China on Aug. 8, 2014, and from Patent Application No. 201410404755.8 filed in The People's Republic of China on Aug. 15, 2014, the entire contents of which are hereby incorporated by reference.

FIELD OF THE INVENTION

The present invention relates to a drive circuit for a permanent magnet motor, and is particularly suitable for small motors for use in low-power fans, water pumps, etc.

BACKGROUND OF THE INVENTION

During the starting process of the synchronous motor, the electromagnet of the stator produces an alternating magnetic field and drags the permanent magnet rotor to oscillate. If the rotor obtains enough kinetic energy, the oscillation amplitude of the rotor will constantly increase, which finally accelerates the rotation of the rotor rapidly to be synchronous with the alternating magnetic field of the stator. For guaranteeing the starting of the traditional synchronous motor, the starting point of the motor is usually set to be lower, which results in that the motor cannot run on a relatively high operating point, and therefore efficiency is lower. In another aspect, the rotor cannot be ensured to rotate in a same direction in every starting since a stop position of the permanent magnetic rotor is unfixed due to characteristics of alternating magnetic field. Accordingly, in applications of fans, water pumps, etc., the impeller driven by the rotor adopts straight type radial blade usually, which results in the lower operational efficiency of the fans, water pumps, etc.

SUMMARY OF THE INVENTION

Hence there is a desire for an improved drive circuit for an electric motor having an improved efficiency or at least provides a useful choice.

Accordingly, in one aspect thereof, the present invention provides a drive circuit for an electric motor comprising a stator and a permanent magnet rotor rotatable with respect to the stator, the stator comprising a stator core and a stator coil wound on the stator core, the drive circuit comprising: a controllable bidirectional AC switch connected in series with the stator coil between two terminals for connecting to an AC power supply; a first position sensor and a second position sensor for detecting positions of the magnetic poles of the permanent magnet rotor; and a voltage regulating circuit connected between the two terminals and the controllable bidirectional AC switch and configured to supply power to the first sensor during positive cycle of the AC power supply and to the second position sensor during negative cycle of the AC power supply such that the controllable bidirectional AC switch is switched between a conductive state and a non-conductive state in a predetermined manner, thus enabling the stator coil to urge the rotor only in a fixed direction during the start-up phase of operation of the motor.

Preferably, the first and second position sensors have identical magnetic field positions with respect to the magnetic poles of the permanent magnet rotor.

Preferably, a current output end of a first unidirectional conductive switch is connected to a control end of the controllable bidirectional AC switch.

Preferably, an output end of the first position sensor is connected to a current input end of the first unidirectional conductive switch, and an output end of the second position sensor is connected to the current output end of the first unidirectional conductive switch via a resistor.

Preferably, the voltage regulating circuit comprises a first zener diode and a second zener diode reversely connected in parallel between the two terminals at least via a first resistor and a second resistor respectively, a positive power supply terminal of the first position sensor is connected to a cathode of the first zener diode, a negative power supply terminal of the second position sensor is connected to the anode of the second zener diode, and a negative power supply terminal of the first position sensor and a positive power supply terminal of the second position sensor are connected to a reference voltage.

Preferably, the anode of the first zener diode, the cathode of the second zener diode, the negative power supply terminal of the first position sensor and the positive power supply terminal of the second position sensor are all connected to the terminal connected to a neutral wire of the AC power supply.

Preferably, the voltage regulating circuit further comprises a second unidirectional conductive switch connected in series between the first resistor and the first zener diode, and a third unidirectional conductive switch connected in series between the second resistor and the second zener diode, the current output end of the second unidirectional conductive switch being connected to the cathode of the first zener diode, and the current input end of the third unidirectional conductive switch being connected to the anode of the second zener diode.

Preferably, an inverter is connected between the first unidirectional conductive switch and the control electrode of the controllable bidirectional AC switch.

Preferably, a switch is connected in parallel with the phase inverter between the first unidirectional conductive switch and the control electrode of the controllable bidirectional AC switch.

Preferably, the controllable bidirectional AC switch is a TRIAC.

Preferably, the unidirectional conductive switch is a diode or a transistor.

Preferably, the controllable bidirectional AC switch is connected in parallel with the voltage regulating circuit, so that no current flows through the voltage regulating circuit while the controllable bidirectional AC switch is conductive.

Preferably, a non-uniform air gap is formed between the stator and the permanent magnet rotor, enabling a polar axis of the permanent magnet rotor to have an angular offset with respect to a central axis of the stator when the rotor is at rest.

Preferably, the permanent magnetic rotor operates at a constant rotational speed of 60 f/p during a steady state of the motor, where f is a frequency of the AC power supply and p is the number of pole pairs of the rotor.

BRIEF DESCRIPTION OF THE DRAWINGS

A preferred embodiment of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
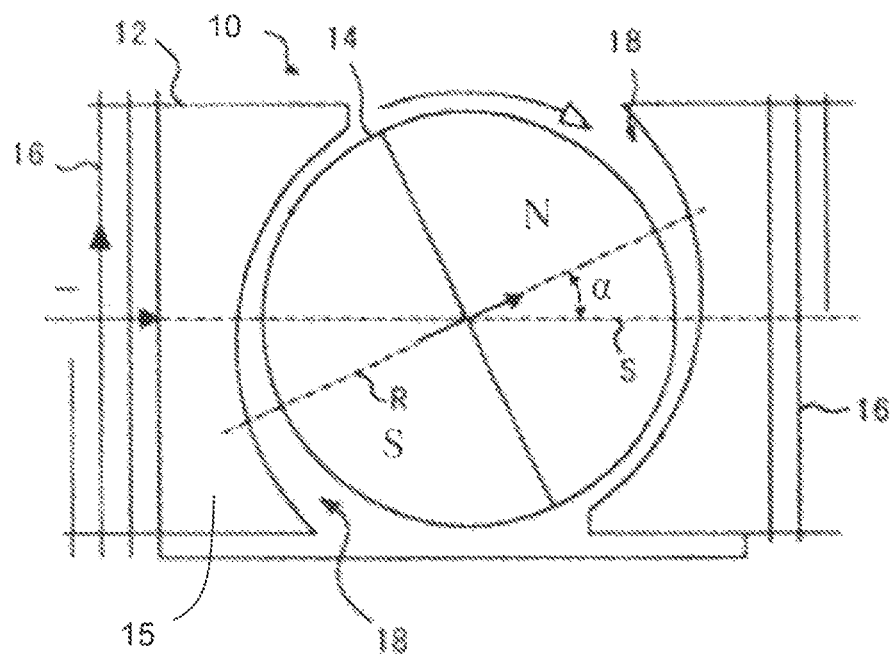
FIGS. 1 and 2 schematically show a synchronous motor in accordance with an embodiment of the present invention.

FIG. 1 is a schematic diagram of a synchronous motor in accordance with an embodiment of the present invention. The synchronous motor 10 comprises a stator 12, and a permanent magnet rotor 14 rotatably disposed between the magnetic poles of the stator 12. The stator 12 has a stator core 15 and a stator winding 16 wound on the stator core. The rotor 14 includes at least one permanent magnet forming at least one pair of permanent magnetic poles with opposite polarities. The rotor 14 operates at a constant rotational speed of 60 f/p during a steady state phase of operate when the stator winding 16 and an AC power supply are connected in series, where f is a frequency of the AC power supply and p is the number of pole pairs of the rotor.

A non-uniform air gap 18 is formed between the magnetic poles of the stator 12 and the magnetic poles of the rotor 14, thus enabling the polar axis R of the rotor 14 to be offset by an angle α with respect to the central axis S of the stator 12 when the rotor 14 is at rest. This configuration enables the rotor 14 to have a fixed starting direction (in the clockwise direction in this example) each time the stator coil 16 is energized. In FIG. 1, both the stator and the rotor have two magnetic poles.

Figure 2:
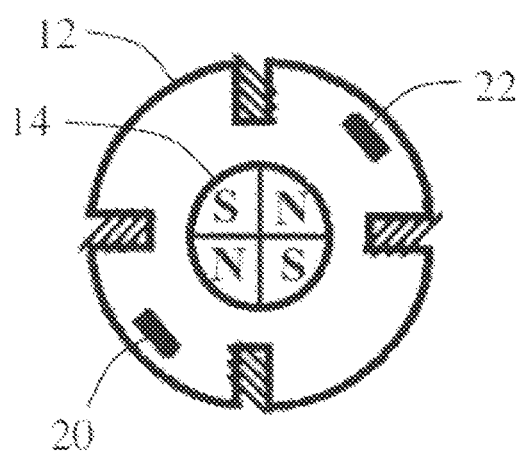

It should be understood that the stator and the rotor can have more magnetic poles. For example, as shown in FIG. 2, both the stator 12 and the rotor 14 have four magnetic poles, and a first position sensor 20 and a second position sensor 22 are fixed to the stator 12 for detecting the magnetic pole position of the rotor. In this example, the first position sensor 20 and the second position sensor 22 are diagonally positioned, and have identical magnetic field positions with respect to the magnetic pole of the permanent magnet rotor. If the two position sensors are both energized, the detection signals output therefrom are the same. The two position sensors 20 and 22 preferably are Hall effect sensors, and offset by an angle with respect to the central axis S of the stator, and preferably, this offset angle is also α.

Figure 3:
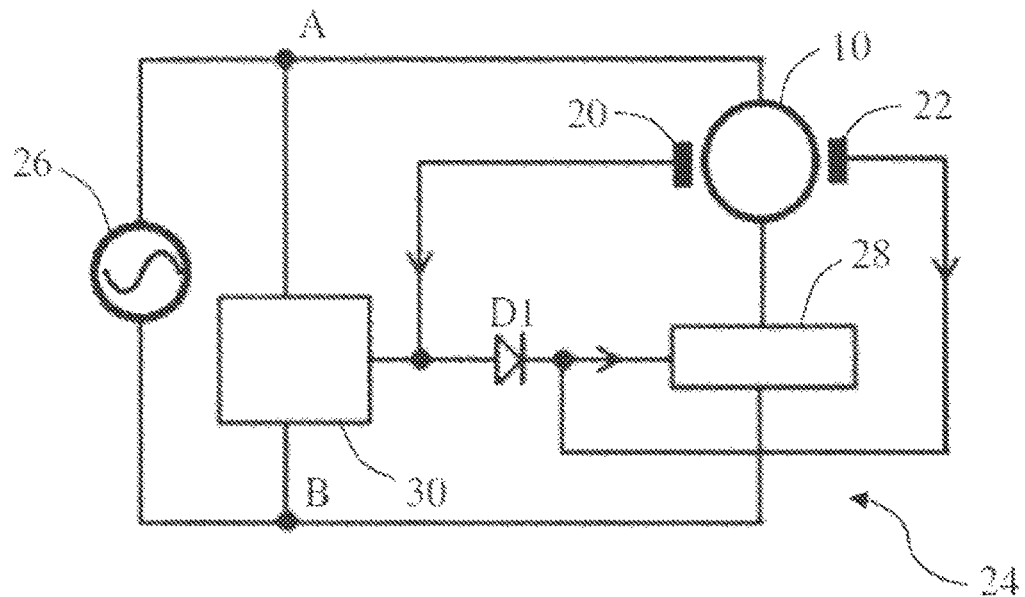
FIG. 3 illustrates a structural block diagram of a drive circuit for a synchronous motor in accordance with an embodiment of the present invention.

FIG. 3 illustrates a structural block diagram of a drive circuit for a synchronous motor according to an embodiment of the present invention. The drive circuit 24 is powered by an AC power supply 26. The AC power supply 26 is preferably a commercial AC power supply which has a fixed frequency, for example 50 Hz or 60 Hz, and voltage, for example 110 V, 220 V or 230 V. The stator coil 16 of the motor 10 and the controllable bidirectional AC switch 28 are connected in series between two nodes A and B. Node A is connected to the live wire of the AC power supply 26, and Node B is connected to the neutral wire of the AC power supply 26. Preferably, the controllable bidirectional AC switch 28 is a Triode AC Semiconductor Switch known as a TRIAC. A voltage regulating circuit 30 is provided between the AC power supply 26 and the controllable bidirectional AC switch. The voltage regulating circuit 30 supplies power to the first position sensor 20 during positive half cycles of the AC power supply and to the second position sensor 22 during negative half cycles of the AC power supply to switch the AC switch 28 between a conductive state and a non-conductive state in a predetermined manner so as to allow the stator coil 16 to urge the rotor 14 to rotate only in a fixed direction during the start-up phase of operation. According to the embodiment of the present invention, the rotor can be accelerated to be synchronous with the stator magnetic field only by one revolution after the stator coil is energized. Preferably, the drive circuit 24 is provided with a first unidirectional conductive switch D1. The signal output end of the first position sensor 20 is connected to the current input end of the unidirectional conductive switch D1 and the signal output end of the first position sensor 22 is connected to the current output end of the unidirectional conductive switch D1. Thus the output signals of the first position sensor 20 and the second position sensor 22 are able to control the bidirectional AC switch 28. Preferably, the first unidirectional conductive switch D1 is a diode, an anode of the diode is the current input end of the switch, and a cathode of the diode is the current output end of the switch.

Figure 4:
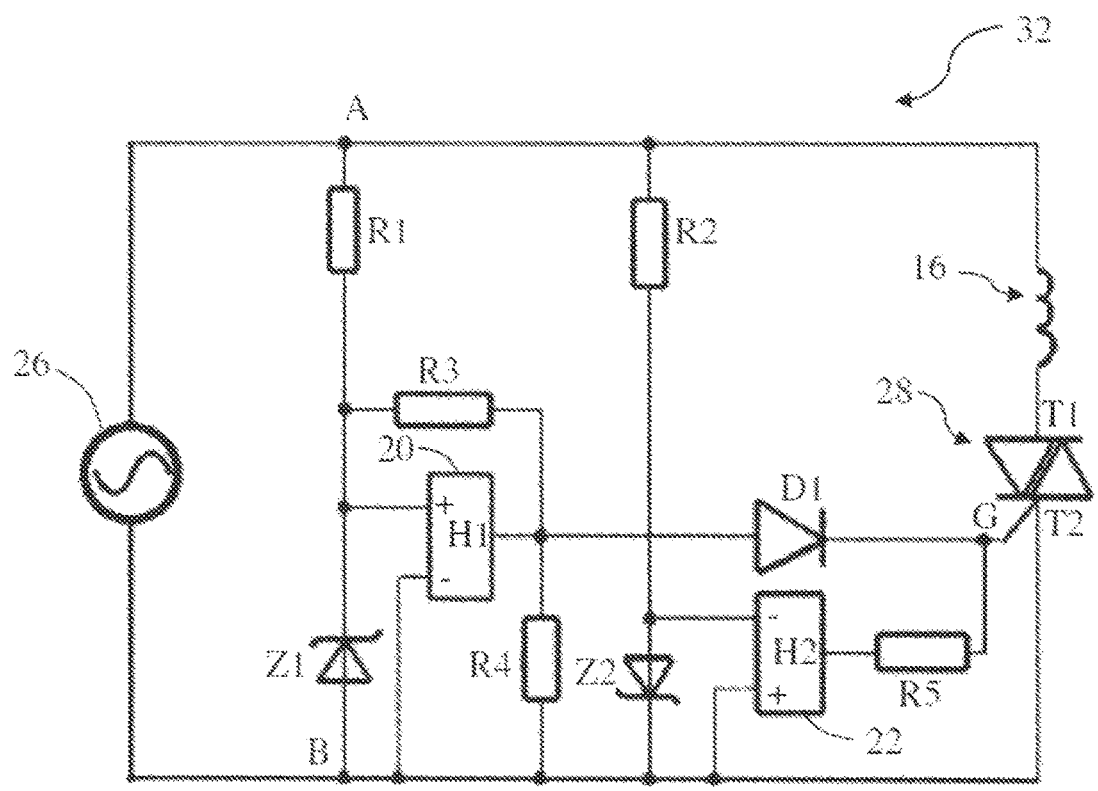
FIG. 4 illustrates a drive circuit according to another embodiment of the present invention.

FIG. 4 illustrates a circuit diagram of a drive circuit 32 according to another embodiment of the present invention. The stator coil 16 and the TRIAC 28 are connected in series between the two nodes A and B configured to connect to the AC power supply 26. The voltage regulating circuit is provided between the two nodes and comprises a first zener diode Z1 and a second zener diode Z2 reversely connected in parallel between the two nodes A and B via a first resistor R1 and a second resistor R2 respectively. Node A is connected to the live wire of the AC power supply 26, and node B is connected to the neutral wire of the AC power supply 26. Preferably, one end of the first resistor R1 is connected to node A, and the other end of the first resistor R1 is connected to the cathode of the first zener diode Z1 and the positive power supply terminal of the first position sensor 20. One end of the second resistor R2 is connected to node A, the other terminal of the second resistor R2 is connected to the negative power supply terminal of the second position sensor 22 and the anode of the second zener diode Z2. The negative power supply terminal of the first position sensor 20, the anode of the first zener diode Z1, the positive power supply terminal of the second position sensor and the cathode of the second zener diode Z2 are connected to node B. The output end H1 of the first position sensor 20 is connected to the positive power supply terminal of the first position sensor 20 via the third resistor R3 and is connected to node B via the fourth resistor R4. The drive circuit 32 is further provided with a first unidirectional conductive switch D1. The current input end of the first unidirectional conductive switch D1 is connected to the output end H1 of the first position sensor 20. The current output end of the first unidirectional conductive switch is connected to the control electrode G of the TRIAC 28 and is connected to the output end H2 of the second position sensor 22 via a fifth resistor R5. Preferably, the first unidirectional conductive switch D1 is a diode, the anode of which is the current input end, and the cathode of which is the current output end.

Figure 5:
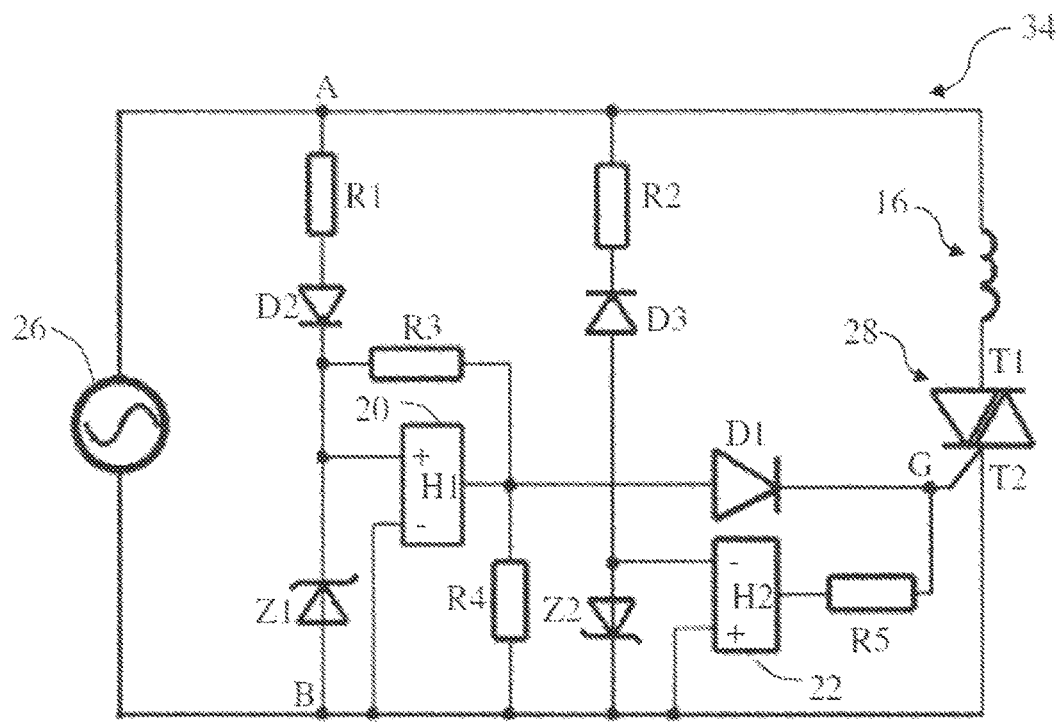
FIG. 5 illustrates a drive circuit according to another embodiment of the present invention.

FIG. 5 illustrates the circuit diagram of the drive circuit 34 according to another embodiment of the present invention. The drive circuit 34 of this embodiment is similar to the drive circuit 32 of the previous embodiment and differs from the drive circuit 32 in that the voltage regulating circuit of the drive circuit 34 further comprises a second unidirectional conductive switch D2 and a third unidirectional conductive switch D3. The second unidirectional conductive switch D2 is disposed between the first resistance R1 and the first zener diode Z1 and is in reverse series with the first zener diode Z1. Preferably, the current input end of the second unidirectional conductive switch D2 is connected to the first resistor R1, and the current output end of the second unidirectional conductive switch D2 is connected to the cathode of the first zener diode Z1. The third unidirectional conductive switch D3 is connected between the second resistance R2 and the second zener diode Z2 and is in reverse series with the second zener diode Z2. Preferably, the current output end of the third unidirectional conductive switch D3 is connected to the second resistor R2, and the current input end of the third unidirectional conductive switch D3 is connected to the anode of the second zener diode Z1. Preferably, the second and third unidirectional conductive switch D2, D3 are diodes, and the anodes of the diodes are the current input ends, and the cathodes are the current output ends.

Figure 6:
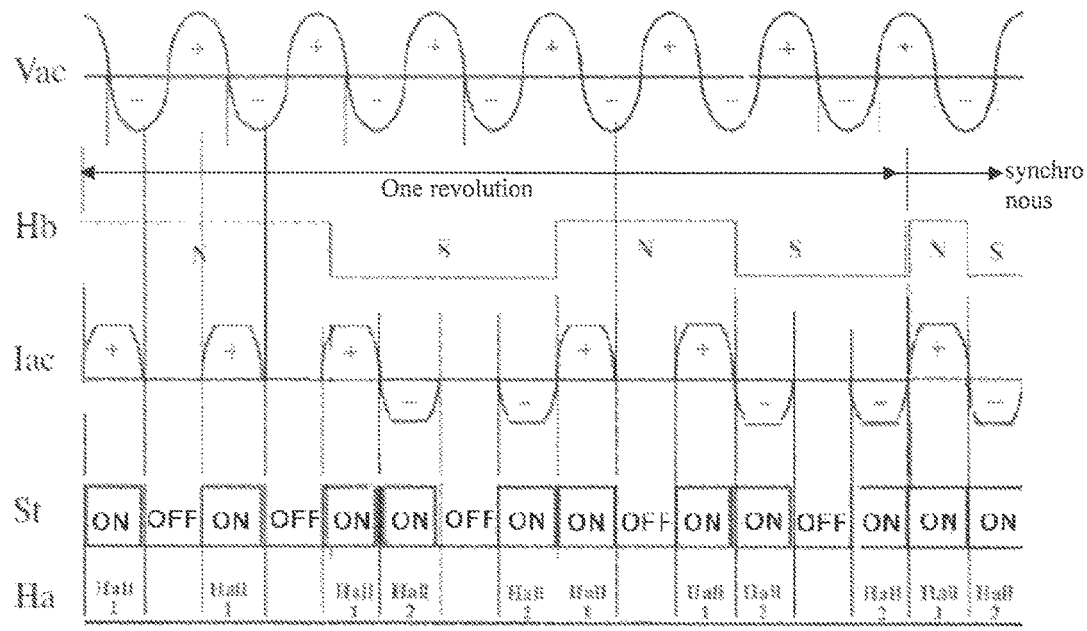
FIG. 6 illustrates a waveform chart of the drive circuit of FIG. 5.

With reference to FIG. 6, the following description is made with respect to the operation principle of drive circuit 34. In FIG. 6, Vac represents the waveform of the voltage of the AC power supply 26, and Iac represents the waveform of the current flowing through the stator coil 16. Due to the inductive character of the stator coil 16, the current waveform Iac lags behind the voltage waveform Vac. St represents the on/off state of TRIAC 28. Ha represents the TRIAC 28 is controlled by which of the first position sensor 20 and the second position sensor 22, wherein when Ha is Hall1, it represents that the TRIAC 28 is switched on under the control of the output signal of the first position sensor 20, when Ha is Hall2, it represents that the TRIAC 28 is switched on under the control of the output signal of the second position sensor 22. Hb represents the rotor magnetic field detected by position sensors. In this embodiment, when the first position sensor 20 and the second position sensor 22 are normally supplied with power and the rotor magnetic field detected is north pole (North), Hb is logic high level, and logic low level is detected when the south pole (South) is detected. in a case that the first and second position sensors 20, 22 are powered normally, Hb is a logic high level in a case that the detected rotor magnetic field is North, or a logic low level in a case that the detected rotor magnetic field is South.

First, when the rotor magnetic field detected by position sensors is North, in the first positive half cycle of the AC power supply, with gradual increasing of the voltage, the second diode D2 is switched on, and the first zener diode Z1 stabilizes the voltage at the positive power terminal of the first position sensor 20 near a predetermined positive voltage value to make the first position sensor 20 work normally, and the output end H1 of the first position sensor 20 outputs the logic high level. The third diode D3 on another branch circuit of voltage regulating circuit is switched off, and the second zener diode Z2 is also switched off, the second position sensor 22 does not have an operating voltage, thus its output end H2 does not have output. As the first diode D1 is conductive, drive current flows through the first resistor R1, the second diode D2, resistor R3, the first diode D1, as well as the control electrode G and the second anode T2 of TRIAC 28. When the drive current flowing through the control electrode G and the second anode T2 is greater than a gate trigger current Ig, the TRIAC 28 is switched on and the forward current flows through the stator coil 16 of the motor to drive the rotor to rotate in a clockwise direction. During the negative half cycle of AC power supply, the TRIAC 28 is switched off before zero-crossing point of the current Iac. Then the first zener diode Z1 is switched off, the first position sensor 20 does not have the operating voltage, the output end H1 of the first position sensor 20 does not have output, and the first diode D1 is switched off. In the other branch of the voltage regulating circuit, the stabilized voltage provided by the second zener diode Z2 makes the second position sensor 22 work normally, the output end H2 of the second position sensor 22 outputs the logic high level. Therefore, there is no drive current flowing through the control electrode G and second anode T2 of the TRIAC 28, and the TRIAC 28 is kept switched off, and the rotor rotates in the clockwise direction under the effect of inertia. During the second positive half cycle of AC power supply, identical to the first positive half cycle, the output end H1 of the first position sensor 20 outputs the logic high level, the second position sensor 22 does not have output, and the TRIAC 28 is switched on again. The forward current flowing through the stator coil 18 continues to drive the rotor 14 to rotate in the clockwise direction. Similarly, till the next negative half cycle of AC power supply, the second position sensor 22 outputs the logic high level, the first position sensor 20 does not have output, the TRIAC 28 is kept in the switch-off state after the zero-crossing point of current Iac, and the rotor continues to rotate in the clockwise direction under the effect of inertia.

After the position sensors detect that the rotor magnetic field Hb changes from North to South, during the negative half cycle of the AC power supply, the first position sensor 20 does not have the operating voltage, the output end H1 of the first position sensor 20 has no output, the stabilized voltage provided by the second zener diode Z2 makes the second position sensor 22 work normally and the output end H2 of the second position sensor 22 outputs a logic low level, the third diode D3 is switched on, and the drive current flows through the second anode T2 and the control electrode G of the TRIAC 28, the fifth resistor R5, the second position sensor 22, the third diode D3 and the second resistor R2. When the drive current flowing through the second anode T2 and the control electrode G is greater than the gate trigger current Ig, the TRIAC 28 is switched on, and a reverse current flows through the stator coil 16 of the motor. Because the rotor magnetic field is South, the rotor 14 continues to be driven to rotate in the clockwise direction. During the positive half cycle of the AC power, the TRIAC 28 is switched off at a zero-crossing point of the current Iac, the second diode D2 is switched on, the first position sensor 20 works normally, and the output H1 of the first position sensor 20 outputs the logic low level. The third diode D3 in the other branch of the voltage regulating circuit is switched off, the second position sensor 22 does not have operating voltage, thus the output end H2 of the second position sensor does not have output. At this time, the first diode D1 is switched off, there is no drive current flowing through the control electrode G and the second anode T2 of the TRIAC 28, the TRIAC 28 is kept in the switch-off state, and the rotor continues to rotate in the clockwise direction under the effect of inertia.

At the next negative half cycle, identical to the previous negative half cycle, the output end H1 of the first position sensor 20 has no output, the second position sensor 22 outputs the logic low level, the third diode D3 is switched on, and the TRIAC 28 is switched on when the drive current flowing through the second anode T2 and the control electrode G is greater than the gate trigger current Ig, a reverse current flows through the stator coil 16 of the motor, and the rotor 14 continues to be driven in clockwise direction. To the positive half cycle of the power supply, the first position sensor 20 outputs the logic low level, the second position sensor 22 has no output, the first diode D1 is switched off, the TRIAC 28 is kept in the switch-off state after a zero-crossing point of the current, and the rotor continues to rotate in clockwise direction under the effect of inertia.

The principle of the drive circuit 32 in FIG. 4 is substantially identical with that of the drive circuit 34. The difference is that, during the positive half cycle of the AC power supply, the second position sensor 22 has no output but the second zener diode Z2 is switched on. When a forward current flows through the stator coil, current also flows through the branch having the second resistor R2 and the second zener diode Z2. Similarly, during the negative half cycle of the AC power supply, the first position sensor 20 has no output but the first zener diode Z1 is switched on. When the reverse current flows through the stator coil, current also flows through the branch having the first resistor R1 and the first zener diode Z1.

The drive circuits of the embodiments of the present invention have the advantages that the circuit is simple, motor starting is fast, and efficiency is higher. The drive circuit of the embodiments of the present invention adopts two position sensors which output signals at the positive half cycle and the negative half cycle of the AC power supply respectively to switch the AC switch between conductive state and nonconductive state in a predetermined manner, thus enabling the stator coil to urge the rotor to rotate only in a fixed direction during the start-up phase of motor operation. According to the present invention, after the stator coil is energized, the rotor only needs to rotate one revolution to be accelerated to synchronize with the magnetic field of the stator. In addition, for the drive circuit 34, due to the existence of the second diode D2 and the third diode D3, the current flows through only one of the branch circuits of the voltage regulating circuit at the same time, namely at the positive half cycle of the power supply, the third diode D3 is switched off, no current flows through the second resistor R2 and the second zener diode Z2, and at the negative half cycle, the second diode D2 is switched on, no current flows through the first zener diode Z1 and the first resistor R1, and accordingly power efficiency is higher.

Figure 7:
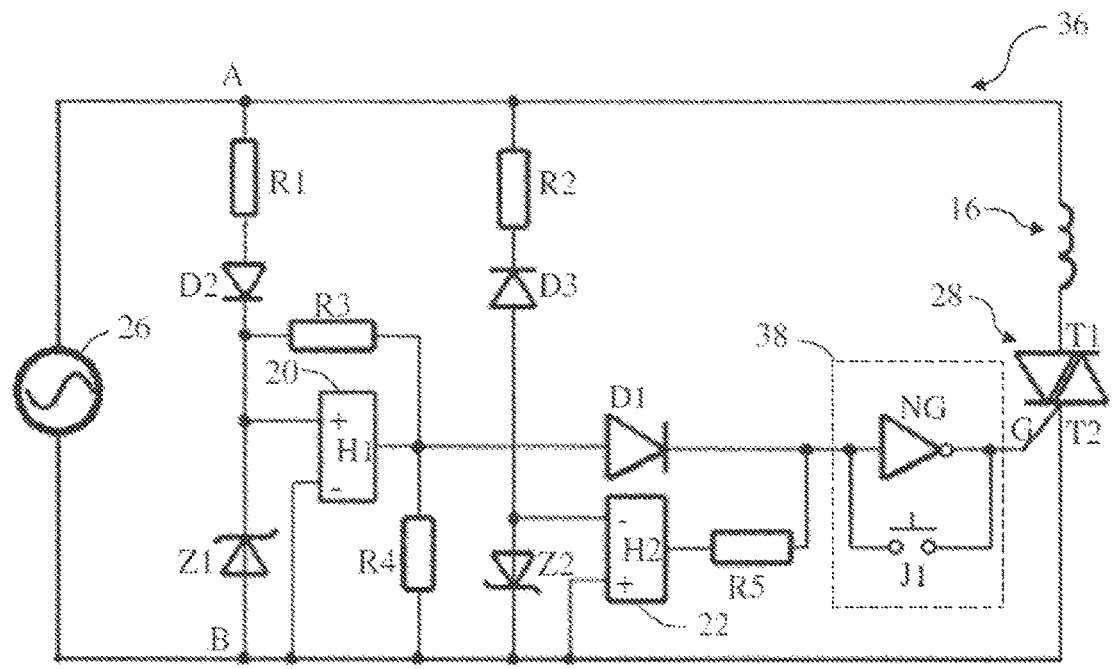
FIGS. 7 to 9 illustrate drive circuits according to further embodiments of the present invention.

FIG. 7 illustrates the circuit diagram of the drive circuit 36 according to another embodiment of the present invention. The drive circuit 36 is similar to the drive circuit 34 in the previous embodiment. The difference is that a steering preset circuit 38 is provided between the first unidirectional conductive switch D1 and the TRIAC 28 in the drive circuit 36. The steering preset circuit 38 comprises an inverter NG and a switch J1 connected in parallel between the current output end of the first unidirectional conductive switch D1 and the control electrode G of the TRIAC 28. When the switch J1 is switched on, the rotor 14 is started in the clockwise direction, like the previous embodiments. When the switch J2 is switched off, the rotor 14 can be changed to be started in the counterclockwise direction. Thus, the starting direction of the motor rotor can be selected by selecting ON/OFF of the switch J1 without other modifications of the drive circuit, and accordingly, the drive circuit of the present embodiment has good versatility.

Figure 8:
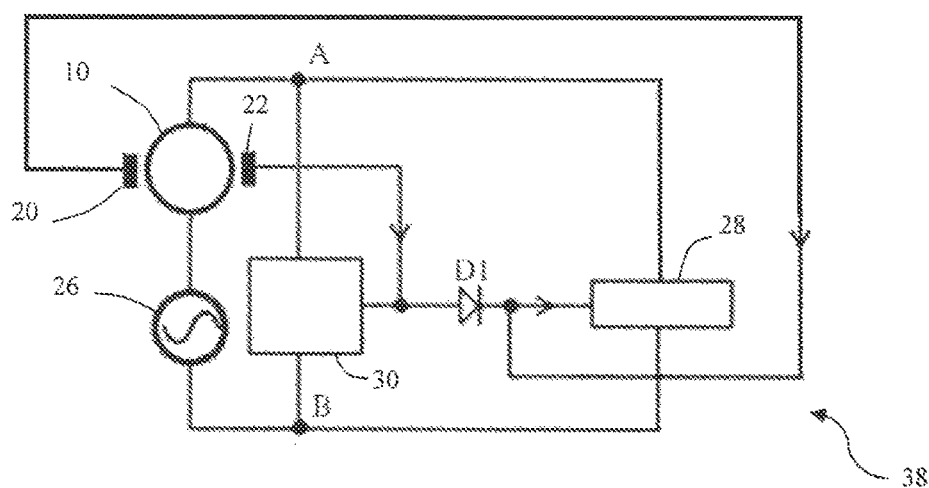

FIG. 8 illustrates a structural block diagram of another drive circuit according to an embodiment of the present invention. The drive circuit 38 is similar to the drive circuit 24 shown in FIG. 3. The difference is that in the drive circuit 38, the AC power supply 26 and the stator winding 16 of the motor are connected in series between a node A and a node B, and the voltage regulating circuit 30 is connected in parallel with the TRIAC 28. In the present embodiment, when the TRIAC 28 is switched on, no current flows through the voltage regulating circuit 30, thus the power consumption by the resistor in the voltage regulating circuit 30 can be avoided when the TRIAC 28 is switched on, thus greatly improving the utilization efficiency of electric energy.

Figure 9:
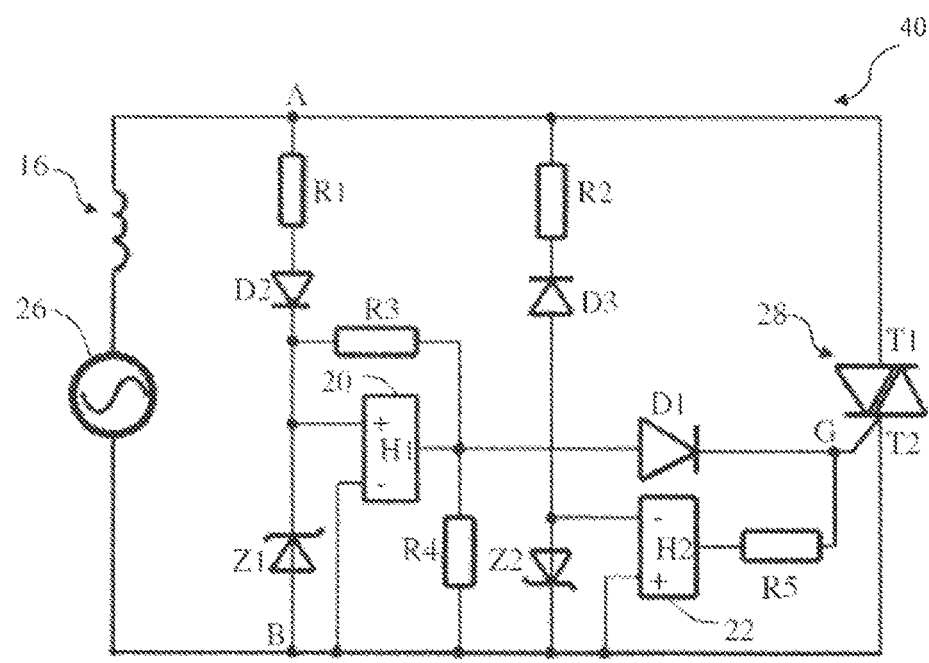

FIG. 9 shows the circuit diagram of the drive circuit 40 in accordance with another embodiment of the present invention. The drive circuit 40 is similar to the drive circuit 34, except that in the drive circuit 40, the stator coil 16 of the motor and the AC power supply 26 are connected in series between node A and node B.

Although the invention has been described with reference to one or more preferred embodiments, it should be appreciated by those skilled in the art that various modifications are possible. Therefore, the scope of the invention is to be determined by reference to the claims that follow.

For example, the controllable bidirectional AC switch 28 can also be realized by for example two silicon control rectifiers (SCR) in reverse parallel, and corresponding control circuit is arranged to control the two silicon control rectifiers in a predetermined manner.

For example, the unidirectional conductive switch can be a transistor.

For example, the driver circuit according to the embodiments of the present invention may be applied to motor types with permanent magnet rotors other than synchronous motors, such as brushless DC motors.

In the description and claims of the present application, each of the verbs "comprise", "include", "contain" and "have", and variations thereof, are used in an inclusive sense, to specify the presence of the stated item or feature but do not preclude the presence of additional items or features.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

The invention claimed is:

1. A drive circuit for an electric motor comprising a stator and a permanent magnet rotor rotatable with respect to the stator, the stator comprising a stator core and a stator coil wound on the stator core, the drive circuit comprising:
    a controllable bidirectional AC switch connected in series with the stator coil between two terminals for connecting to an AC power supply;
    a first position sensor and a second position sensor for detecting positions of the magnetic poles of the permanent magnet rotor, the first position sensor directly coupled to a control electrode of the controllable bidirectional AC switch via a first unidirectional conductive switch and the second position sensor directly coupled to the control electrode of the controllable bidirectional AC switch via a resistor; and a voltage regulating circuit connected between the two terminals and the controllable bidirectional AC switch and configured to supply power to the first sensor during a positive cycle of the AC power supply and to the second position sensor during a negative cycle of the AC power supply such that the first and second position sensors alternatively output a signal to the controllable bidirectional AC switch to directly switch the controllable bidirectional AC switch between a conductive state and a non-conductive state in a predetermined manner, thus enabling the stator coil to urge the rotor only in a fixed direction during start-up of the motor, and wherein the voltage regulating circuit comprises a first zener diode and a second zener diode reversely connected in parallel between two terminals of the AC power supply at least via a first resistor and a second resistor respectively, a positive power supply terminal of the first position sensor is connected to a cathode of the first zener diode, a negative power supply terminal of the second position sensor is connected to an anode of the second zener diode, and a negative power supply terminal of the first position sensor and a positive power supply terminal of the second position sensor are connected to a reference voltage.

2. The drive circuit of claim 1, wherein the first and second position sensors have identical magnetic field positions with respect to the magnetic poles of the permanent magnet rotor.

3. The drive circuit of claim 2, wherein a current output end of the first unidirectional conductive switch being connected to a control end of the controllable bidirectional AC switch.

4. The drive circuit of claim 3, wherein an output end of the first position sensor is connected to a current input end of the first unidirectional conductive switch, and an output end of the second position sensor is connected to the current output end of the first unidirectional conductive switch via a resistor.

5. The drive circuit of claim 1, wherein the anode of the first zener diode, the cathode of the second zener diode, the negative power supply terminal of the first position sensor and the positive power supply terminal of the second position sensor are all connected to the terminal connected to a neutral wire of the AC power supply.

6. The drive circuit of claim 1, wherein the voltage regulating circuit further comprises a second unidirectional conductive switch connected in series between the first resistor and the first zener diode, and a third unidirectional conductive switch connected in series between the second resistor and the second zener diode, the current output end of the second unidirectional conductive switch being connected to the cathode of the first zener diode, and the current input end of the third unidirectional conductive switch being connected to the anode of the second zener diode.

7. The drive circuit of claim 1, further comprising an inverter connected between the first unidirectional conductive switch and the control electrode of the controllable bidirectional AC switch.

8. The drive circuit of claim 7, further comprising a switch connected in parallel with the phase inverter between the first unidirectional conductive switch and the control electrode of the controllable bidirectional AC switch.

9. The drive circuit of claim 1, wherein the controllable bidirectional AC switch is a TRIAC.

10. The drive circuit of claim 3, wherein the unidirectional conductive switch is a diode or a transistor.

11. The drive circuit of claim 1, wherein the controllable bidirectional AC switch is connected in parallel with the voltage regulating circuit, so that no current flows through the voltage regulating circuit while the controllable bidirectional AC switch is conductive.

12. The drive circuit of claim 1, wherein a non-uniform air gap is formed between the stator and the permanent magnet rotor, enabling a polar axis of the permanent magnet rotor to have an angular offset with respect to a central axis of the stator when the rotor is at rest.

13. The drive circuit of claim 1, wherein the permanent magnetic rotor operates at a constant rotational speed of $60f/p$ during a steady state of the motor, where f is a frequency of the AC power supply and p is the number of pole pairs of the rotor.

14. A drive circuit for an electric motor comprising a stator and a permanent magnet rotor rotatable with respect to the stator, the stator comprising a stator core and a stator coil wound on the stator core, the drive circuit comprising:

a controllable bidirectional AC switch connected in series with the stator coil between two terminals for connecting to an AC power supply;

a first position sensor and a second position sensor for detecting positions of the magnetic poles of the permanent magnet rotor; and a voltage regulating circuit connected between the two terminals and the controllable bidirectional AC switch and configured to supply power to the first sensor during a positive cycle of the AC power supply and to the second position sensor during a negative cycle of the AC power supply such that the first and second position sensors alternatively output a signal to the controllable bidirectional AC switch to switch the controllable bidirectional AC switch between a conductive state and a non-conductive state in a predetermined manner, thus enabling the stator coil to urge the rotor only in a fixed direction during start-up of the motor; and wherein the voltage regulating circuit comprises a first zener diode and a second zener diode reversely connected in parallel between the two terminals at least via a first resistor and a second resistor respectively, a positive power supply terminal of the first position sensor is connected to a cathode of the first zener diode, a negative power supply terminal of the second position sensor is connected to the anode of the second zener diode, and a negative power supply terminal of the first position sensor and a positive power supply terminal of the second position sensor are connected to a reference voltage.

* * * * *